(12) United States Patent
Centner et al.

(10) Patent No.: US 9,917,485 B2
(45) Date of Patent: Mar. 13, 2018

(54) REDUCTION OF THE ELECTRICAL RESISTANCE FOR AN ELECTRIC MACHINE HAVING WINDINGS ARRANGED IN GROOVES

(71) Applicant: SIEMENS AKTIENGESELLSCHAFT, München (DE)

(72) Inventors: Matthias Centner, Berlin (DE); Patrick Gels, Berlin (DE); Rüdiger Schäfer, Berlin (DE); Jörg Waschek, Falkensee (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 473 days.

(21) Appl. No.: 14/409,937

(22) PCT Filed: Jun. 6, 2013

(86) PCT No.: PCT/EP2013/061672
§ 371 (c)(1),
(2) Date: Dec. 19, 2014

(87) PCT Pub. No.: WO2013/189750
PCT Pub. Date: Dec. 27, 2013

(65) Prior Publication Data
US 2015/0200574 A1      Jul. 16, 2015

(30) Foreign Application Priority Data

Jun. 22, 2012   (DE) .................. 10 2012 210 614

(51) Int. Cl.
*H02K 3/28*        (2006.01)
*H02K 3/14*        (2006.01)

(52) U.S. Cl.
CPC ................. *H02K 3/28* (2013.01); *H02K 3/14* (2013.01)

(58) Field of Classification Search
CPC .. H02K 3/28; H02K 3/14; H02K 3/12; H02K 3/46; H02K 3/48; H02K 3/50
(Continued)

(56) References Cited

U.S. PATENT DOCUMENTS

| 7,642,667 B2 | 1/2010 | Wobben |
| 8,497,614 B2 | 7/2013 | Möhle et al. |

(Continued)

FOREIGN PATENT DOCUMENTS

| AT | 91774 B | 3/1923 |
| DE | 315354 C | 11/1919 |

(Continued)

OTHER PUBLICATIONS

Richter R.; "Lehrbuch der Wicklungen elektrischer Maschinen" (Textbook of Windings of Electric Machines); Verlag and Druck G. Braun—Karlsruhe; pp. 175-177; 1952; DE.

(Continued)

*Primary Examiner* — Michael Andrews
(74) *Attorney, Agent, or Firm* — Henry M. Feiereisen LLC

(57) ABSTRACT

An electric machine has grooves and windings, divided into strands, of electrical conductors. At least one strand has a number s of coils connected in series and arranged in the grooves. Each coil has sub-conductors connected in parallel and arranged in bundles. Each bundle is arranged in a groove at a bundle position relative to a deepest possible bundle position in the groove. The positions of all bundles in all coils define a number b of possible bundle positions of the strand. The bundles are interchanged between the coils such that each bundle is arranged in the grooves at least n times (Continued)

and at most n' times at each possible bundle position, wherein n is the integer quotient in regard to the quotient of the number s and the number b, wherein n'=n if s is divisible by b and n'=n+1 if s is not divisible by b.

6 Claims, 4 Drawing Sheets

(58) Field of Classification Search
USPC .................................................. 310/208, 195
See application file for complete search history.

(56) References Cited

U.S. PATENT DOCUMENTS

| 2002/0047443 | A1 | 4/2002 | Heyden et al. | |
| 2008/0272669 | A1* | 11/2008 | Mohle | H02K 3/28 310/198 |
| 2011/0285142 | A1* | 11/2011 | Groendahl | H02K 3/345 310/215 |
| 2012/0205998 | A1 | 8/2012 | Seibicke et al. | |

FOREIGN PATENT DOCUMENTS

| DE | 347028 C | 1/1922 |
| DE | 613780 C | 5/1935 |
| DE | 740651 C | 10/1943 |
| DE | 10005179 A1 | 8/2001 |
| DE | 102006021354 A1 | 11/2007 |
| EP | 2194268 A1 | 6/2010 |
| EP | 2388892 A1 | 11/2011 |
| GB | 10919 A | 0/1914 |
| RU | 2224346 C2 | 2/2004 |
| SU | 1603483 A1 | 10/1990 |

OTHER PUBLICATIONS

Sequenz H.; "Die Wicklungen elektrischer Maschinen" (The Windings of Electric Machines); Springer Verlag Wien; Dritter Band; pp. 350-351; 1954.

Sequens H.; "Herstellung der Wicklungen elektrischer Maschinen" (Manufacturing the Windings of Electric Machines); Springer Verlag, Wien—New York; pp. 78; ISBN: 3-211-81068-4; 1973.

Müller G. et al; "Berechnung elektrischer Maschinen" (Calculating electric machines); Wiley-VCH Verlag GmbH&Co. KGaA; Auflage 6; pp. 388-390; ISBN 3-527-40525-9; 2008.

* cited by examiner

REDUCTION OF THE ELECTRICAL RESISTANCE FOR AN ELECTRIC MACHINE HAVING WINDINGS ARRANGED IN GROOVES

CROSS-REFERENCES TO RELATED APPLICATIONS

This application is the U.S. National Stage of International Application No. PCT/EP2013/061672, filed Jun. 6, 2013, which designated the United States and has been published as International Publication No. WO 2013/189750 and which claims the priority of German Patent Application, Serial No. 10 2012 210 614.6, filed Jun. 22, 2012, pursuant to 35 U.S.C. 119(a)-(d).

BACKGROUND OF THE INVENTION

The invention relates to an electric machine having grooves and windings of electrical conductors, wherein the windings are divided into strands, wherein at least one strand has a respective number s of coils connected in series, which are each are arranged in the grooves, wherein the coils each comprise sub-conductors connected in parallel, wherein the sub-conductors of a coil are in each case arranged in a plurality of bundles, wherein a bundle of a coil is in each case connected in series to a bundle of a coil connected in series, wherein each bundle of the at least one strand is in each case arranged in a groove at a respective bundle position in relation to a deepest possible bundle position in the groove, wherein the respective bundle positions of all bundles in all coils of the at least one strand in each case define a respective number b of possible bundle positions of the at least one strand.

In the case of electrical conductors through which alternating current flows, the current density inside a conductor is lower than it is on the surface. This effect, known as current displacement or skin effect, is also observed for an electric machine comprising windings and turns arranged in grooves. In particular, in the case of high feed frequencies, these current displacement phenomena between the sub-conductors (so-called first-order current displacement) result in massive supplementary losses.

To date, the following measures have been used to reduce these supplementary losses, in particular in the case of coil windings. For example, a bundle interchange is performed with which the parallel sub-conductors are divided into two bundles, wherein the upper and the lower bundle are interchanged approximately in the middle of the coil group. This measure is very similar to bar transposition with bar windings, which is known as a Roebel bar. Alternatively, it is also possible to use a sub-conductor transposition for which the sub-conductors are transposed 180° in a short distance at a specific position either inside a coil or between two coils of a coil group.

A device of this kind is, for example, known from DE 1 041 148 A. Here, conductive bars are embodied as Roebel bars in that with a conductive bar, the sub-conductors are inclined into two planes and offset from one conductor plane into the other conductor plane.

The invention is based on the object of reducing the electrical resistance for an electric machine that has windings arranged in grooves and can be operated with alternating current.

SUMMARY OF THE INVENTION

This object is achieved by an electric machine of the type mentioned in the introduction in that the bundles of the at least one strand are in each case interchanged between the coils in such a way that each bundle of the at least one strand is arranged in the grooves in each case at least n times and at most n" times at each respective possible bundle position of the at least one strand in relation to the respective deepest possible bundle position in the groove, wherein n is the integer quotient with regard to the quotient of the number s of coils of a strand connected in series and the number b of possible bundle positions of a strand, wherein $n'=n$ if s is divisible by b and $n'=n+1$ if s is not divisible by b.

Interchanging the bundles of the at least one strand in this way ensures that each bundle of the strand is arranged as equally frequently as possible at each of the respective possible bundle positions:

if the number s of coils of the strand connected in series is a integral multiple of the number b of possible bundle positions of the strand, each bundle is exactly equally frequently at each of the possible bundle positions;

if the number s of coils of the strand connected in series is not divisible by the number b of possible bundle positions of the strand, a bundle of the strand is arranged in each of the b possible bundle positions at least n times and at most $n'=n+1$ times, wherein n is the integer quotient of s with respect to b: if r is set by the remainder of the quotient s/b, the result is that a total of $n'=n+1$ bundles are located in r bundle positions and a total of n bundles are located in (b-r) bundle positions.

This arrangement of the bundles causes the respective bundles to be located as equally deep as possible in the interior of the windings arranged in the grooves of the electric machine compared to the remaining bundles of the strand and viewed over the entire length of a bundle. Hence, this bundle arrangement enables the current displacement between the electrical conductors of the electric machine to be very effectively reduced. Therefore, overall, the electric machine has a lower ohmic resistance, which saves energy during the operation of the electric machine.

Here, the suggested interchanging of the bundles is more efficient than the aforementioned known bundle interchanging with which the parallel sub-conductors for each winding are divided into, for example, two bundles so that an upper and a lower bundle are formed, which are interchanged approximately in the middle of the coil group. Due to the significantly reduced supplementary losses, therefore, the electric machine according to the invention has much lower ohmic resistances than electric machines with the known bundle interchanging.

The electric machine according to the invention also has advantages compared to the known sub-conductor transposition, with which the sub-conductors are transposed 180° over a short distance because the suggested interchanging of the bundles is much easier to implement from a technical point of view.

Preferably, the electric machine according to the invention comprises three strands, which are assigned to the three current phases. Here, it is possible to carry out the suggested interchange of the bundles for each of the strands in order to minimize current displacement effects between the strands. The electric machine also preferably comprises at least three coils connected in series per strand, wherein the number b of possible bundle positions is also preferably at least three.

In a preferred embodiment of the invention, each bundle of the at least one strand is arranged in the grooves exactly equally frequently at each of the possible bundle positions of the at least one strand in relation to the deepest possible bundle position in the groove. Hence, the number s of the coils of the strand connected in series is an integral multiple of the number b of possible bundle positions of the strand. This arrangement of the bundles counteracts the current displacement particularly effectively because the effects of the individual bundles compensate one another. Hence, a particularly lower ohmic resistance of the electric machine is achieved.

In a further advantageous embodiment of the invention, the bundles of the at least one strand are in each case cyclically interchanged after each coil. The cyclic interchange of the bundles offers the advantage of being particularly simple to implement from a technical point of view.

For example, for an electric machine with four bundles, a cyclic interchange of the bundles can be achieved in that between the coils the three lowermost bundles are introduced from a first groove into the next groove as the three uppermost bundles and the uppermost bundle of the first groove is introduced past the three aforementioned bundles and under the three aforementioned bundles into the next groove. In the area of the bundle interchange, the bundles can be fastened to one another, for example by taping, to achieve improved mechanical stability and to suppress unwanted vibration.

It is also possible to carry out the respective interchanging of the bundles between the respective grooves as centrally as possible and as symmetrically as possible in relation to the ends of the grooves so that, even during the respective interchanging of the bundles between the grooves, the respective bundles are located as deeply as possible in the interior in relation to the other windings compared to the remaining bundles of the strand and the current displacement is minimized.

In a further advantageous embodiment of the invention, at least two strands have the respective number s of coils connected in series, which are each arranged in the grooves, wherein each coil is arranged in a groove in each case at a respective coil position in relation to a deepest possible coil position in the groove, wherein the respective coil positions of all coils of the respective strand define a respective number p of possible coil positions of the strand, wherein the coil positions of the respective strand are interchanged in such a way that each coil of the respective strand is arranged in the grooves at least m times and at most (m+1) times at each of the possible coil position of the respective strand in relation to the deepest possible coil position in the groove, wherein m is the integer quotient with regard to the quotient of the number s of coils of a strand connected in series and the number p of possible coil positions of a strand, wherein m'=m if s is divisible by p and m'=m+1 if s is not divisible by p.

The arrangement of a plurality of coils in a groove produces the number p of possible coil positions. Similarly to the above-described interchanging of the bundles and the bundle positions, the coils and the coil positions are interchanged. Interchanging the coils of the at least two strands in this way ensures that each coil of the respective strand is arranged as equally frequently as possible at each of the respective possible coil positions.

This arrangement of the coils causes the respective coils to be located as equally deep as possible in the interior of the windings viewed over the entire length of the respective strand. Hence, this coil arrangement enables the current displacement between the electrical conductors of the electric machine that results in excessive ohmic losses to be even more effectively reduced. Hence, in particular the combination of the interchanging of the bundles with the interchanging the coils results in an extremely advantageous conductor arrangement in relation to current displacement effects for each bundle of each strand. Overall, therefore, the electric machine has a particularly lower ohmic resistance which saves even more energy with the operation of the electric machine.

In a further advantageous embodiment of the invention, the coil positions of the respective strand between the grooves are interchanged in such a way that each coil position of the respective strand in the grooves is arranged exactly equally frequently at each of the possible coil positions of the respective strand in relation to the deepest possible coil position in the groove. Hence, the number s of the coils of the strand connected in series is an integral multiple of the number p of possible coil positions of a strand. This arrangement of the coils particularly effectively counteracts the current displacement because the effects of the individual coils compensate one another. Hence, a particularly lower ohmic resistance of the electric machine is achieved.

In a further advantageous embodiment of the invention, the coil positions of the respective strand between the grooves are in each case cyclically interchanged. Similarly to the above-described cyclic interchanging of the bundles, the cyclic interchanging the coils is particularly simple to accomplish from a technical point of view.

BRIEF DESCRIPTION OF DRAWING

The following describes and explains the invention in more detail with reference to the exemplary embodiments in the figures, which show.

DETAILED DESCRIPTION OF PREFERRED EMBODIMENTS

Figure 1:
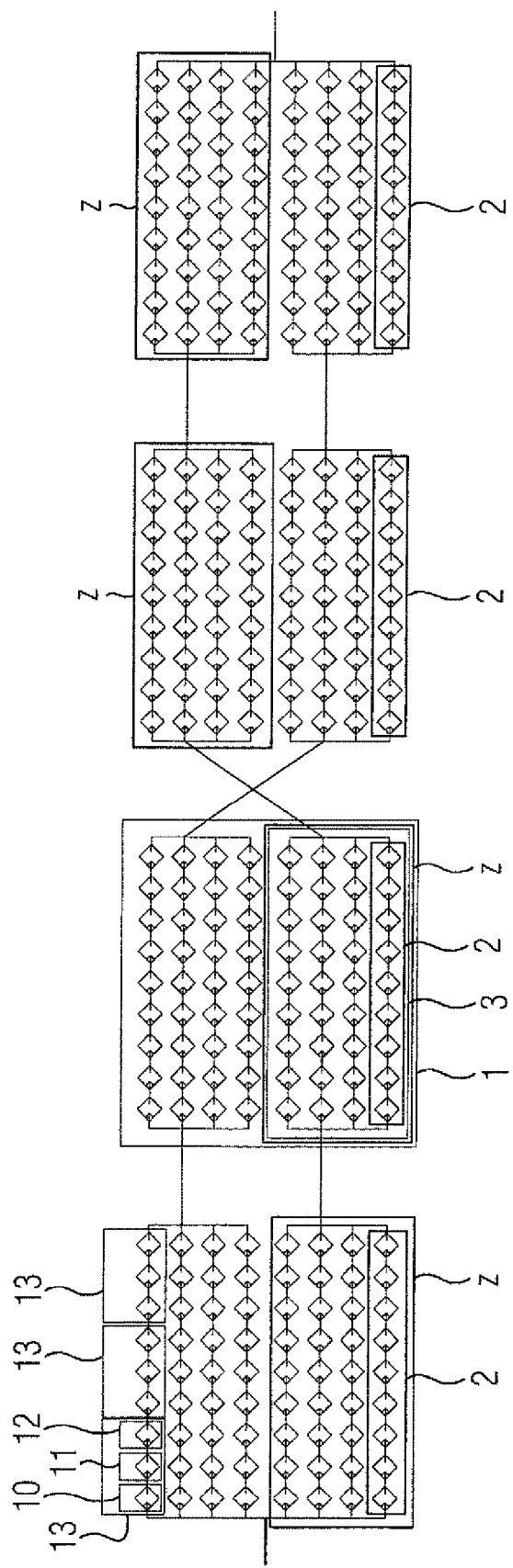
FIG. 1 a circuit diagram of an electric machine from the prior art.

FIG. 1 shows a circuit diagram of an electric machine from the prior art. A coil 1 comprises eight sub-conductors 2 connected in parallel, wherein four sub-conductors 2 are combined in a bundle 3. Each sub-conductor 2 comprises three windings 13 connected in series, which each in turn comprise an outgoing conductor 10 and a return conductor 12, which are in each case connected via a conductor in the area of the winding head 11.

The circuit diagram from the prior art shows a total of four coils 1 connected in series. The different sub-conductors 2 in each coil 1 are usually inserted in a groove of the electric machine. In the following, it is assumed that the lower of the two bundles 3 of a coil 1 is arranged at the deepest possible bundle position in a groove. It is known from the prior art to interchange the bundles 3 in the middle of the coil group so that the arrangement of the bundles 3 between the first coil 1 and the second coil 1 and between the third coil 1 and the fourth coil 1 is not changed. On the other hand, the upper bundle 3 or the lower bundle 3 of the second coil 1 is connected to the lower bundle 3 or the upper bundle 3 of the third coil 1 and this represents the actual bundle interchanging. This type of circuit is comparable to a Roebel bar.

Figure 2:
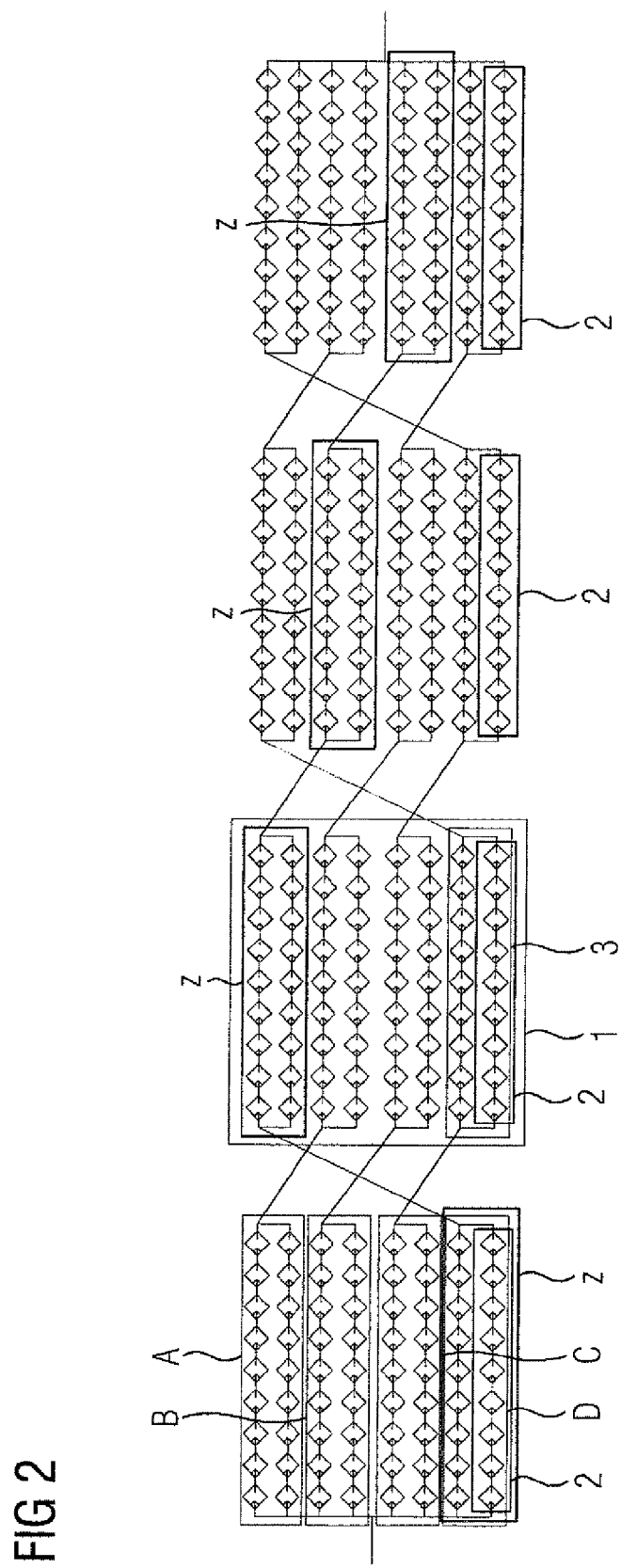
FIG. 2 a first embodiment of a circuit diagram of an electric machine according to the invention, FIG. 3 a second embodiment of a circuit diagram, and FIG. 4 a three-dimensional representation of an interchange of bundles according to a third embodiment.

FIG. 2 shows a first embodiment of a circuit diagram of an electric machine according to the invention. Each coil 1 in turn comprises eight sub-conductors 2, which are combined in pairs to form a total of four bundles 3. In the following, it is assumed that the lowest of the four bundles 3 of the first coil 1 is arranged at the deepest possible bundle position, designated bundle position D, in a groove of the electric machine. Correspondingly, the second lowest bundle 3 is arranged at bundle position C, the second topmost bundle 3 at bundle position B and the topmost bundle 3 at bundle position A.

Between the first coil 1 and the second coil 1, the bundles 3 are interchanged in such a way that the bundle 3, which is arranged in the first coil 1 at bundle position A or B or C or D, is connected to the bundle 3 of the second coil 1 at bundle position B or C or D or A, respectively. This interchange is repeated between the further coils 1. Overall, hence, each of the four bundles 3 in the four coils 1 are in each case arranged once at bundle position A, B, C and D. Hence, each of the bundles 3 is located equally deep in the interior of the windings arranged in the grooves of the electric machine over the entire length of a plurality of coils 1 connected in series. This enables current displacement effects in the individual bundles 3 to compensate one another particularly effectively, as a result of which the ohmic resistance of the entire circuit the electric machine is particularly low.

Figure 3:
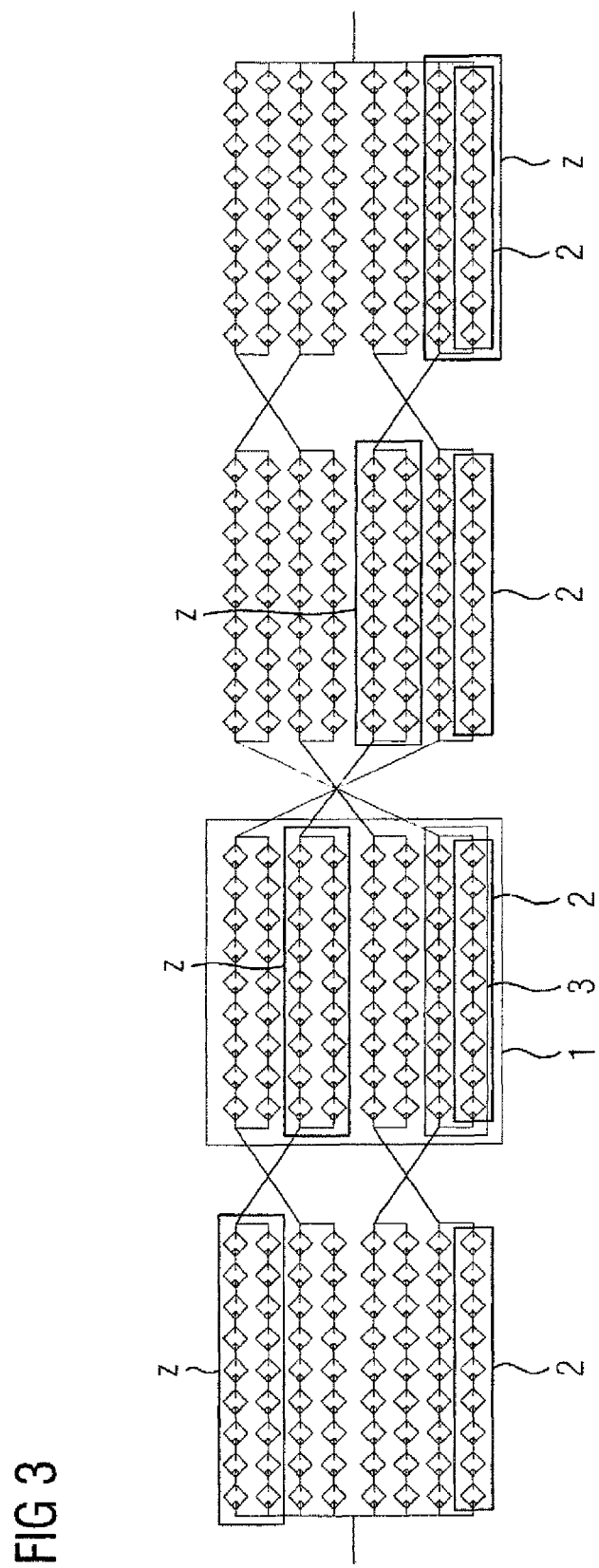

FIG. 3 shows a second embodiment of a circuit diagram. Each coil 1 in turn comprises eight sub-conductors 2, which are combined in pairs to form a total of four bundles 3, wherein a total of four coils 1 are connected in series. In each case in the coil pair of the first and second coil 1 and the coil pair of the third and fourth coil 1, the bundles 3 are interchanged as follows: the topmost bundle 3 of one coil 1 of the coil pair is connected to the second topmost bundle 3 of the other coil 1 of the coil pair; the lowest bundle 3 of one coil 1 of the coil pair is connected to the second lowest bundle 3 of the other coil 1 of the coil pair.

In the coil pair of the second and the third coil 1, the bundles 3 are interchanged in such a way that the topmost bundle 3 of one coil 1 of the coil pair is connected to the lowest bundle 3 of the other coil 1 of the coil pair and the second topmost bundle 3 of one coil 1 of the coil pair is connected to the second lowest bundle 3 of the other coil 1 of the coil pair.

This type of interchanging of the bundles 3 also has the result that each of the four bundles 3 in the four coils 1 is in each case arranged once on each of the four possible bundle positions. Each of the bundles 3 is located equally deep in the interior of the windings arranged in the grooves of the electric machine over the entire length of a plurality of coils 1 connected in series, as a result of which the current displacement effects of the individual coils 1 particularly effectively compensate one another.

Figure 4:
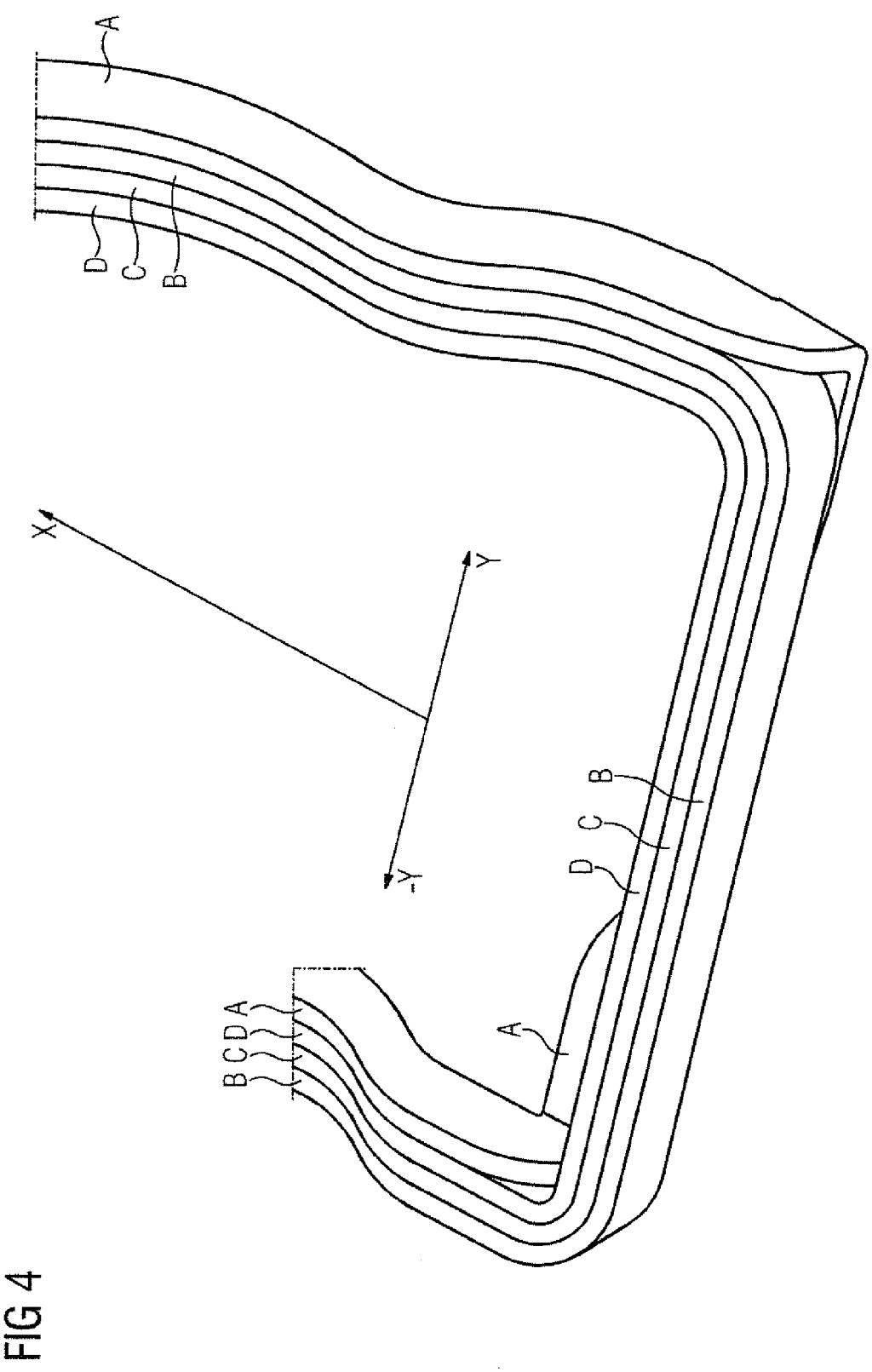

FIG. 4 shows a three-dimensional representation of an interchanging of bundles according to a third embodiment. A groove of the electric machine extends in the direction of the arrow x. At the top of the drawing, that is in the positive y-direction, is located the end of a first coil 1, which protrudes from a groove of the electric machine and comprises four bundles 3. Relative to the middle of the conductor arrangement of the electric machine, which is located at y=0, the positive y-direction points from the inside to the outside so that the four bundles 3 are arranged from the inside to the outside in the sequence of bundle positions (D, C, B, A). Viewed from the middle of the conductor arrangement, the negative y-direction also points outward. Located at the bottom, that is in the negative y-direction, is the end of a second coil 1, which protrudes from a further groove of the electric machine and once again comprises four bundles 3. The four bundles 3 the first coil 1 are diverted in a U-shape and connected to the four bundles 3 the second coil 1.

Between the first coil 1 and the second coil 1 connected in series to the first coil 1, the bundles 3 are interchanged as follows, wherein the designations of the bundle positions (A, B, C and D) in each case only relate to the bundle positions in the first coil 1. Observed from the inside to the outside, at the output from the first coil 1, four bundles 3 are arranged in the sequence of bundle positions (D, C, B, A). The block of the three bundles 3 of the bundle positions (D, C, B) is retained and is diverted in an U-shape and inside the block connected in the sequence (D, C, B) from the inside to the outside to the respective bundles 3 of the second coil 1. The bundle 3 of the original bundle position A of the first coil 1 is diverted in such a way that the position of the bundle 3 changes: after the first coil 1 arranged completely outside, the bundle 3 is connected to the bundle 3 of the second coil 1, which lies completely inside.

Hence, observed from the inside to the outside, the sequence (D, C, B, A) of the four bundles 3 is changed after the first coil 1 in the sequence (A, D, C, B) so that a cyclic interchange is achieved. This interchange is repeated between the further coils 1.

To summarize, the invention relates an electric machine having grooves and windings of electrical conductors, wherein the windings are divided into strands Z, wherein at least one strand Z has a respective number s of coils connected in series, which are each arranged in the grooves, wherein the coils each comprise sub-conductors 2 connected in parallel, wherein the sub-conductors 2 of a coil are in each case arranged in a plurality of bundles, wherein a bundle of a coil is in each case connected in series to a bundle of a coil connected in series, wherein each bundle of the at least one strand Z in a groove is in each case arranged at a respective bundle position in relation to a deepest possible bundle position in the groove, wherein the respective bundle positions of all bundles in all coils of the at least one strand Z define a respective number b of possible bundle positions of the at least one strand Z. In order to reduce the electrical resistance for an electric machine that has windings arranged in grooves and can be operated with alternating current, it is suggested that the bundles of the at least one strand Z is in each case interchanged between the coils in such a way that each bundle of the at least one strand Z is in each case arranged in the grooves at least n times and at most n' times at each of the respective possible bundle position of the at least one strand Z in relation to the respective deepest possible bundle position in the groove, wherein n is the integer quotient with regard to the quotient of the number s of coils of a strand Z connected in series and the number b of possible bundle positions of a strand Z, wherein n'=n if s is divisible by b and n'=n+ if s is not divisible by b.

The invention claimed is:
1. An electric machine, comprising:
electrical conductors having windings which are divided into strands, at least one strand having a number s of multiple-turn coils which are connected in series and respectively arranged in grooves of the electric machine, each said coil comprising sub-conductors connected in parallel and arranged in bundles, each said bundle being connected in series to a bundle of another coil that is connected in series,
wherein each bundle of the at least one strand in a groove is arranged at a bundle position in relation to a deepest possible bundle position in the groove, with the bundle positions of all bundles in all coils of the at least one strand defining a number b of possible bundle positions of the at least one strand, wherein the bundles of the at least one strand are interchanged between the coils in such a way that each bundle of the at least one strand is arranged in the grooves at least n times and at most n' times at each of the possible bundle positions of the at least one strand in relation to the deepest possible bundle position in the groove, wherein n is the integer quotient with regard to a quotient of the number s of coils of the at least one strand that are connected in series and the number b of possible bundle positions of the at least one strand, wherein n'=n if s is divisible by b and n'=n+1 if s is not divisible by b.

2. The electric machine of claim 1, wherein each bundle of the at least one strand is arranged in the grooves with identical frequently at each of the possible bundle positions of the at least one strand in relation to the deepest possible bundle position in the groove.

3. The electric machine of claim 1, wherein the bundles of the at least one strand are cyclically interchanged after each coil.

4. The electric machine of claim 1, wherein at least two of said strand have the number s of coils that are connected in series and arranged in the grooves, each coil being arranged in a groove at a coil position in relation to a deepest possible coil position in the groove, with the coil positions of all coils of a respective strand defining a number p of possible coil positions of the strand and being interchanged in such a way that each coil of the respective strand is arranged in the grooves at least m times and at most (m+1) times at each possible coil position of the respective strand in relation to the deepest possible coil position in the groove, wherein m is the integer quotient with regard to a quotient of the number s of coils of a strand connected in series and the number p of possible coil positions of a strand, wherein m'=m if s is divisible by b and m'=m+1 if s is not divisible by b.

5. The electric machine of claim 4, wherein the coil positions of the respective strand are interchanged between the grooves in such a way that each coil position of the respective strand in the grooves is arranged with identical frequency at each of the possible coil positions of the respective strand in relation to the deepest possible coil position in the groove.

6. The electric machine of claim 4, wherein the coil positions of the respective strand are cyclically interchanged between the grooves.

* * * * *